Figure 1:
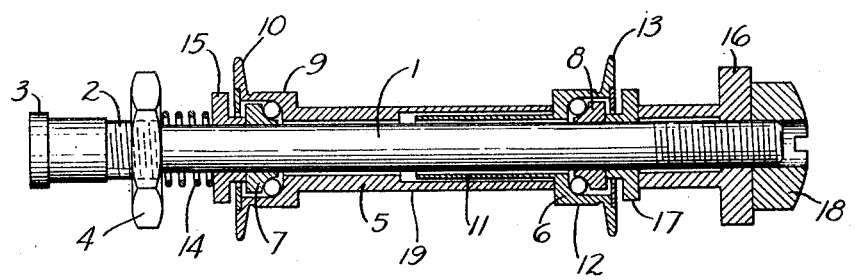

May 23, 1933.  E. WATTS  1,910,976

FILM GUIDE ROLLERS

Filed June 5, 1930

INVENTOR
E. WATTS
BY
G. H. Heydt
ATTORNEY

Patented May 23, 1933

1,910,976

UNITED STATES PATENT OFFICE

EDWARD WATTS, OF ALDWYCH, LONDON, ENGLAND, ASSIGNOR TO ELECTRICAL RESEARCH PRODUCTS, INC., OF NEW YORK, N. Y., A CORPORATION OF DELAWARE

FILM GUIDE ROLLERS

Application filed June 5, 1930, Serial No. 459,332, and in Great Britain February 15, 1930.

This invention relates to guide rollers for a film in motion picture recording and reproducing devices.

In such devices the film passes over one or more guide rollers as well as over driving sprockets. In many devices the guide rollers consist of flanged rollers having a reduced central portion. The edges of the film bear upon cylindrical surfaces immediately inside the flanges. Such rollers are usually mounted by journal bearings upon studs or spindles in various positions of a motion picture recording or reproducing mechanism. In many cases guide rollers of this type mounted on plane journal bearings cause excessive wear of the film through failure to rotate as the film passes thereover. Moreover, in cases of sound recording and reproducing machines, it is essential that the speed of the film past the sound modulator or reproducing gate should be substantially constant. When guide rollers mounted upon plane journal bearings are used, irregularities in the speed of the film are introduced by friction caused by the drag of the bearings. Friction also has a tendency to cause a pull on the film by the driving sprocket.

A secondary drag on the film is introduced when plane flanges are used on the guide rollers. This is particularly noticeable on guide rollers with loose flanges which have a tendency to grip the edges of the film as it approaches and leaves the rollers. Depending upon the alignment of the edges of the film, this drag may be constant or may be intermittent which in itself introduces objectionable irregularities.

According to the present invention guide rollers in motion picture machines are mounted upon ball or roller bearings. In many cases the guide rollers are biased axially by a spring to take up a predetermined position. In such cases ball and thrust bearings may be provided capable of withstanding both radial and axial forces. When the rollers have a loose flange or otherwise divided into two parts which are biased by a spring in an axial direction, both parts may be provided with ball or radial bearings for withstanding radial forces and also for withstanding axial force due to the biasing spring, preferably conical ball bearings are utilized to combine both functions.

According to a further feature of the invention, the flanges of the guide rollers are relieved or curved outwardly away from one another so that they only grip the edges of that part of the film which is in contact with the cylindrical surface of the film roller.

The invention is particularly applicable to sound reproducing apparatus in which the film bearing the sound record approaches the sound gate over a flanged guide roller and is drawn past the reproducing gate by a toothed sprocket which engages holes in the film.

For a better understanding of the invention one embodiment thereof will now be described by way of example with reference to the accompanying drawing Fig. 1 and Fig. 2 which shows longitudinal sections through a flanged guide roller mounted upon a stud or spindle according to the invention.

Referring now to the accompanying drawing Fig. 1, a cylindrical stud 1 is provided with an enlarged screw threaded portion 2 and a head 3 which may be engaged in a slot or the like in the frame of a motion picture apparatus or a sound picture recording or reproducing apparatus such as are well known in the art. A nut 4 cooperating with the screw threaded portion 2 serves to clamp the stud 1 in position upon the frame. The guide roller consisting of two parts 5 and 6 is mounted by ball bearings 7 and 8 upon the spindle or stud 1. The part 5 consists of a central cylindrical portion 19 having an enlarged collar 9 at one end and a flange 10 adjacent the collar 9. The ball bearing 7 is of the conical type capable of withstanding both radial and axial forces, and is located within the enlarged collar 9. The part 5 is, throughout the portion of its length, bored to a slightly larger diameter than that of the spindle 1. Throughout the remainder of its length it is bored to a still larger diameter to accommodate with clearance a cylindrical portion 11 formed upon the part 6.

The part 6 consists of a cylindrical collar 12 within which is housed a ball bearing 8 of the conical type capable of withstanding axial and radial forces, adjacent to which is a flange 13. The cylindrical portion 11 of the part 6 is formed integrally with the collar 12 and flange 13 and is bored to a diameter slightly greater than that of the spindle 1. The film guide roller thus comprises two springs pressed relatively displaceable mutually supporting portions in which one of said relatively displaceable portions of the roller telescopes into the other.

A helical compression spring 14 is mounted upon the spindle 1 and bears against the nut 4 and against a thrust washer 15. The thrust washer 15 bears against the inner race of the ball bearing 7. A knurled nut 16 engages the screw threaded end of the spindle 1 and bears against a thrust washer 17. The washer 17 bears against the inner race of the ball bearing 8. A locking nut 18 is provided for locking the nut 16 in the desired position upon the stud 1.

The flanges 10 and 13 instead of being plane on their opposed surfaces are relieved as shown in the drawing, being further apart at their peripheries than they are at their intersections with the collars 9 and 12.

In operation the film bears upon the collars 9 and 12 and is lightly gripped between the bottom of the flanges 10 and 13 owing to the pressure exerted by the spring 14 upon the ball bearing 7 and part 5. Since the flanges 10 and 13 are relieved as described, the edges of the film are only gripped thereby over that part of their length where they are in contact with the cylindrical collars 9 and 12. The position of the film axially with respect to the spindle 1, may be adjusted by screwing up or unscrewing the nut 16, thus compressing or relieving the spring 14. The nut 16 may be locked in position by means of the locking nut 18.

It will be appreciated that there is no friction called into play other than the rolling friction of the ball bearings 7 and 8. The thrust of the spring 14 and counter-thrust of the nut 16 are applied to the parts 5 and 6 respectively through the washers 15 and 17 and through the ball bearings 7 and 8. Likewise all the radial forces are withstood by the ball bearings 7 and 8.

Figure 2:
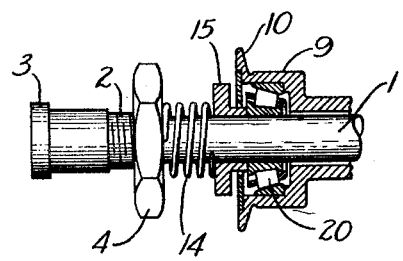

The film roller shown in Fig. 2 is identical with the roller shown in Fig. 1 except that roller bearings are used in place of the ball bearings.

It will be appreciated that the above description is given by way of example only, and that many modifications may be made without departing from the scope of the invention.

What is claimed is:

1. A film guiding mechanism capable of withstanding axial and radial forces comprising a spindle with ball bearings mounted thereon, a roller for said film comprising two relatively displaceable mutually supporting sections with one section telescoping into the other, each section being mounted on a ball bearing and movable in an axial direction, a spring, and means including said spring for biasing the sections of said roller in an axial direction toward each other through said ball bearings.

2. A film guiding mechanism comprising a spindle with anti-frictional bearings movably mounted thereon, a roller for said film comprising two displaceable mutually supporting sections with one section telescoping into the other, flanges at the outer extremes of said roller having their opposed faces relieved to prevent contact with the edges of the film except adjacent to the roller surface, means to mount said roller on said anti-friction bearings, a spring and means including said spring to bias said roller flanges in an axial direction toward each other upon said bearings wherein the spring acts upon the roller through an anti-friction bearing capable of withstanding axial thrust.

3. A film guiding mechanism comprising a spindle, a film guide roller having a flange at each end with opposed faces of said flange relieved to prevent contact with the film except at the roller surfaces, said roller comprising two relatively displaceable mutually supporting sections with one section telescoping into the other, each section having an anti-friction bearing raceway, a thrust collar on said spindle, a raceway movably mounted on said spindle adjacent to said collar, a second raceway movably mounted on said spindle, anti-friction balls in said raceways for supporting said film roller, a spring and means including said spring arranged to exert pressure on said second raceway and consequently on the two sections of the roller and the first raceway for biasing the telescoped sections of said roller in an axial direction toward each other through the agency of said bearings.

In witness whereof, I hereunto subscribe my name this 14th day of May, 1930.

EDWARD WATTS.